United States Patent
Funahashi

(10) Patent No.: US 7,254,260 B2
(45) Date of Patent: Aug. 7, 2007

(54) METHOD AND APPARATUS FOR COMPRESSING IMAGE SIGNALS

(75) Inventor: Takeshi Funahashi, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 755 days.

(21) Appl. No.: 10/044,962

(22) Filed: Jan. 15, 2002

(65) Prior Publication Data

US 2002/0094118 A1    Jul. 18, 2002

(30) Foreign Application Priority Data

Jan. 16, 2001    (JP)    ............................... 2001-007173

(51) Int. Cl.
*G06K 9/00*    (2006.01)
*G06K 9/36*    (2006.01)
*G06K 9/46*    (2006.01)
*A61B 6/00*    (2006.01)
*A61B 6/14*    (2006.01)
*G01N 23/00*    (2006.01)
*G21K 1/12*    (2006.01)
*H05G 1/60*    (2006.01)
*H05G 1/20*    (2006.01)

(52) U.S. Cl. ...................... 382/132; 382/130; 382/232; 378/5; 378/37; 378/105

(58) Field of Classification Search ................ 382/130, 382/132, 232–253, 128; 378/5, 37, 105
See application file for complete search history.

(56) References Cited

U.S. PATENT DOCUMENTS

| | | | |
|---|---|---|---|
| 4,641,242 A | * | 2/1987 | Kimura ...................... 382/128 |
| 4,855,598 A | | 8/1989 | Ohgoda et al. |
| 4,896,037 A | | 1/1990 | Shimura et al. |
| 4,903,317 A | * | 2/1990 | Nishihara et al. ............ 382/244 |
| 5,151,795 A | * | 9/1992 | Adachi ........................ 382/128 |
| 5,267,153 A | * | 11/1993 | Shimura et al. ............. 382/232 |
| 5,485,371 A | | 1/1996 | Ito et al. |
| 5,619,598 A | * | 4/1997 | Nagata et al. .............. 382/305 |
| 5,724,582 A | * | 3/1998 | Pelanek et al. ............. 382/232 |
| 5,796,862 A | * | 8/1998 | Pawlicki et al. ............ 382/132 |
| 5,818,524 A | * | 10/1998 | Juen ............................ 382/232 |
| 6,427,025 B1 | * | 7/2002 | Shimomura et al. ........ 382/232 |
| 2001/0038707 A1 | * | 11/2001 | Ohara ........................ 382/132 |

FOREIGN PATENT DOCUMENTS

JP    3-285475    12/1991

* cited by examiner

*Primary Examiner*—Bhavesh M Mehta
*Assistant Examiner*—Manav Seth
(74) *Attorney, Agent, or Firm*—Sughrue Mion, PLLC

(57) ABSTRACT

A plurality of radiation image signals respectively representing a plurality of radiation images of an object, which radiation images have been formed with several kinds of radiation having different energy distributions, are obtained. An energy subtraction image signal, which has been formed from the plurality of the radiation image signals, is also obtained. Compression processing is performed on the plurality of the radiation image signals and the energy subtraction image signal. The energy subtraction image signal is compressed with a compressibility higher than the compressibility with respect to each of the radiation image signals.

11 Claims, 1 Drawing Sheet

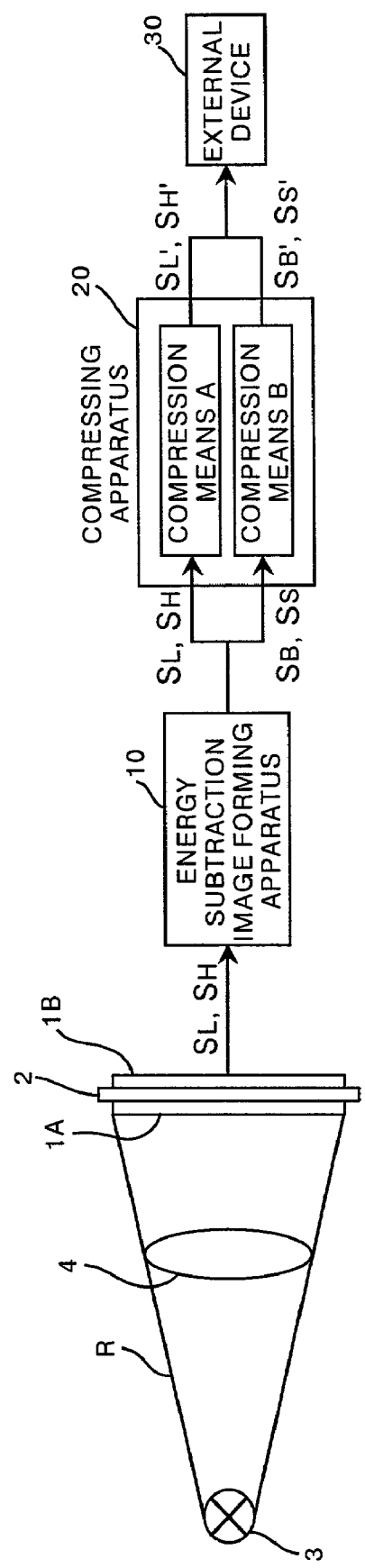

METHOD AND APPARATUS FOR COMPRESSING IMAGE SIGNALS

BACKGROUND OF THE INVENTION

1. Field of the Invention

This invention relates to a method and apparatus for compressing image signals. This invention particularly relates to a method and apparatus for compressing image signals, wherein radiation image signals, which represent radiation images of an object, and an energy subtraction image signal, which is obtained from the radiation image signals of the object, are compressed.

2. Description of the Related Art

Techniques for photoelectrically reading out a recorded radiation image in order to obtain an image signal, performing appropriate image processing on the image signal, and then reproducing a visible image by use of the processed image signal have heretofore been known in various fields. Also, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause the stimulable phosphor sheet to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

In the radiation image recording and reproducing systems wherein recording sheets, such as X-ray film or stimulable phosphor sheets, are used, subtraction processing techniques for radiation images are often performed on image signals detected from a plurality of radiation images of an object, which radiation images have been recorded on the recording sheets.

With the subtraction processing techniques for radiation images, an image is obtained which corresponds to a difference between a plurality of radiation images of an object recorded under different conditions. Specifically, a plurality of the radiation images recorded under different conditions are read out at predetermined sampling intervals, and a plurality of image signals thus detected are converted into digital image signals which represent the radiation images. The image signal components of the digital image signals, which components represent the image information recorded at corresponding sampling points in the radiation images, are then subtracted from each other. A difference signal is thereby obtained which represents the image of a specific structure or part of the object represented by the radiation images.

As one of the subtraction processing techniques described above, an energy subtraction processing technique has heretofore been known. In the energy subtraction processing technique, such characteristics are utilized that a specific structure of an object exhibits different levels of radiation absorptivity with respect to radiation with different energy distributions. Specifically, by the utilization of the characteristics described above, a plurality of radiation images of an object, in which different images of a specific structure of the object are embedded, are formed with several kinds of radiation having different energy distributions. Thereafter, the image signals representing the plurality of the radiation images are weighted appropriately and subjected to a subtraction process in order to extract the image of the specific structure of the object. More specifically, as the plurality of the radiation images described above, a low energy image, which has been formed with radiation containing a comparatively large quantity of low energy components, and a high energy image, which has been formed with radiation containing a comparatively large quantity of high energy components, may be obtained. In cases where the subtraction processing is performed on the low energy image and the high energy image, for example, a soft tissue image, in which only a pattern of a soft tissue of the object is illustrated, or a bone image, in which only a pattern of a bone of the object is illustrated, is obtained as an energy subtraction image in which only a specific structure of the object is illustrated. The applicant proposed novel energy subtraction processing methods using stimulable phosphor sheets in, for example, U.S. Pat. Nos. 4,855,598 and 4,896,037, and Japanese Unexamined Patent Publication No. 3(1991)-285475.

Image signals, which represent the radiation images, such as the low energy image and the high energy image, and an image signal, which represents the energy subtraction image, such as the soft tissue image or the bone image, are transferred to an external device, such as a display device or a printing device. Also, the image signals are transferred to storage media, such as MO, and stored on the storage media. Heretofore, such that the efficiency with which the transfer or the storage is performed may be enhanced, compression processing has been performed on all of the image signals. In such cases, the degree of signal compression has heretofore been set at a value such that the image quality of the image represented by a decompressed image signal, which will later be obtained from decompression processing performed on the compressed image signal, does not become markedly bad. Specifically, of the images described above, the low energy image is the image utilized also in making an ordinary diagnosis, or the like. Therefore, the low energy image signal representing the low energy image has heretofore been compressed with a reversible compressing process, which has the characteristics such that the image quality of the image represented by the decompressed image signal obtained from the decompression processing performed on the compressed image signal, does not become bad, or with an irreversible compressing process utilizing a low compressibility such that the image quality of the image obtained from the decompression processing is capable of being kept to be approximately identical with the original image quality. Also, the high energy image signal representing the high energy image and the energy subtraction image signal representing the energy subtraction image have heretofore been compressed in the same manner as that for the low energy image signal.

However, each of the image signals described above is composed of a very large quantity of data. Therefore, in cases where the signal compression with the reversible compressing process or the irreversible compressing process utilizing the low compressibility is performed, the processing efficiency and the storage efficiency at the time of the transfer, the storage, and the like, cannot be kept sufficiently high.

SUMMARY OF THE INVENTION

The primary object of the present invention is to provide a method of compressing image signals, wherein compressed image signals, which are efficient for transfer to an external device and storage on a storage medium, or the like, are capable of being formed.

Another object of the present invention is to provide an apparatus for carrying out the method of compressing image signals.

The present invention provides a method of compressing image signals, comprising the steps of:

i) obtaining a plurality of radiation image signals respectively representing a plurality of radiation images of an object, which radiation images have been formed with several kinds of radiation having different energy distributions, ii) obtaining an energy subtraction image signal, which has been formed from the plurality of the radiation image signals, and iii) performing compression processing on the plurality of the radiation image signals and the energy subtraction image signal, wherein the energy subtraction image signal is compressed with a compressibility higher than the compressibility with respect to each of the radiation image signals.

The method of compressing image signals in accordance with the present invention includes both the cases where the radiation image signals are compressed with a compressibility lower than the compressibility of the energy subtraction image signal and the cases where the radiation image signals are not compressed.

By way of example, in cases where the compressibility with respect to the energy subtraction image signal is represented by 1/n, and the compressibility with respect to each of the radiation image signals is represented by 1/m, the value of n should preferably be at least 10, and the value of m should preferably be smaller than 10. The compressibility of 1/m described above is the compressibility employed in cases where an irreversible compressing process is performed on each of the radiation image signals. In cases where an irreversible compressing process according to the JPEG method is employed, the value of n should preferably be at least 20, and the value of m should preferably be smaller than 20. In cases where a compressing process utilizing a wavelet transform is employed, the value of n should preferably be at least 40, and the value of m should preferably be smaller than 40. The wavelet transform is one of techniques for frequency analysis and has heretofore been applied to stereo pattern matching, signal compression, and the like. (The wavelet transform is described in, for example, "Image Coding Using Wavelet Transform" by Marc Antonini, et al., IEEE Transactions on Image Processing, Vol. 1, No. 2, pp. 205-220, 1992.)

The present invention also provides an apparatus for compressing image signals wherein:

a plurality of radiation image signals respectively representing a plurality of radiation images of an object, which radiation images have been formed with several kinds of radiation having different energy distributions, are obtained, an energy subtraction image signal, which has been formed from the plurality of the radiation image signals, is obtained, and compression processing is performed on the plurality of the radiation image signals and the energy subtraction image signal are compressed, the apparatus comprising:

a) radiation image signal compressing means for performing compression processing on each of the radiation image signals with a first compressing process, and b) energy subtraction image signal compressing means for performing compression processing on the energy subtraction image signal with a second compressing process, a compressibility in the second compressing process being higher than the compressibility in the first compressing process.

In the apparatus for compressing image signals in accordance with the present invention, the first compressing process may be a reversible compressing process. Also, the second compressing process may be an irreversible compressing process. Alternatively, the first compressing process may be an irreversible compressing process utilizing a low compressibility. In cases where the first compressing process is the irreversible compressing process utilizing the low compressibility, the second compressing process may be an irreversible compressing process utilizing a high compressibility, which is higher than the compressibility in the first compressing process.

Further, in the apparatus for compressing image signals in accordance with the present invention, the compressibility in the first compressing process may be set at 1. Specifically, a selection may be made to perform no compression in the radiation image signal compressing means.

With the method and apparatus for compressing image signals in accordance with the present invention, the energy subtraction image signal is capable of being compressed with a compressibility higher than the compressibility utilized in conventional image signal compressing techniques. Therefore, in cases where the energy subtraction image signal is transferred into an external device or stored on a storage medium, the processing efficiency or the storage efficiency is capable of being enhanced.

Specifically, the low energy image is equivalent to the original image, which is utilized in making an ordinary diagnosis, or the like. Therefore, it is necessary for the compression processing on the low energy image signal representing the low energy image to be performed such that the image quality of the image represented by a decompressed image signal, which is obtained from decompression processing performed on the compressed low energy image signal, is capable of being kept good. However, as for the energy subtraction image signal, in the stage of the energy subtraction processing for forming the energy subtraction image signal, several frequency components are lost, and noise often occurs. Therefore, the image quality of the energy subtraction image represented by the energy subtraction image signal is substantially not so good as the image quality of the original radiation images. Accordingly, in cases where the energy subtraction image signal is subjected to the compression processing with a high compressibility such that the image quality of the image represented by a decompressed image signal, which is obtained from decompression processing performed on the compressed energy subtraction image signal, becomes slightly bad, adverse effects do not occur with respect to the diagnosis, or the like. As described above, with the method and apparatus for compressing image signals in accordance with the present invention, the compression processing with the low compressibility is performed on the radiation image signals representing the radiation images of the object, and the compression processing with the high compressibility is performed on the energy subtraction image signal. In this manner, the compressibility with respect to each of the image signals is optimized. As a result, the transfer efficiency, the storage efficiency, and the like, are capable of being enhanced.

With the method and apparatus for compressing image signals in accordance with the present invention, wherein the first compressing process is the reversible compressing process, each of the radiation image signals is capable of being compressed with the reversible compressing process, and therefore the image quality of the image represented by the decompressed image signal, which is obtained from the decompression processing performed on the compressed radiation image signal, is capable of being kept good.

With the method and apparatus for compressing image signals in accordance with the present invention, wherein the second compressing process is the irreversible compressing process, the energy subtraction image signal is capable of being compressed with the irreversible compressing process, and therefore the compressibility is capable of being set to be high.

BRIEF DESCRIPTION OF THE DRAWING

FIG. 1 is a schematic view showing an example of a radiation image recording and reproducing system, in which an embodiment of the apparatus for compressing image signals in accordance with the present invention is employed.

DESCRIPTION OF THE PREFERRED EMBODIMENTS

The present invention will hereinbelow be described in further detail with reference to the accompanying drawings.

FIG. 1 is a schematic view showing an example of a radiation image recording and reproducing system, in which an embodiment of the apparatus for compressing image signals in accordance with the present invention is employed.

With reference to FIG. 1, the radiation image recording and reproducing system comprises an energy subtraction image forming apparatus 10 for receiving radiation image signals (i.e., a low energy image signal $S_L$ and a high energy image signal $S_H$) having been formed by reading out radiation images of an object, which radiation images have been recorded with a radiation image recording apparatus, with a read-out apparatus. The energy subtraction image forming apparatus 10 performs energy subtraction processing on the received radiation image signals and forms energy subtraction image signals (i.e., a bone image signal $S_B$ and a soft tissue image signal $S_S$). The radiation image recording and reproducing system also comprises a compressing apparatus 20. The compressing apparatus 20 is provided with compression means A for receiving the radiation image signals $S_L$ and $S_H$ from the energy subtraction image forming apparatus 10 and performing compression processing on the radiation image signals $S_L$ and $S_H$. The compressing apparatus 20 is also provided with compression means B for receiving the energy subtraction image signals $S_B$ and $S_S$ from the energy subtraction image forming apparatus 10 and performing compression processing on the energy subtraction image signals $S_B$ and $S_S$. The radiation image recording and reproducing system further comprises an external device 30 for receiving compressed image signals $S_L'$, $S_H'$, $S_B'$, and $S_S'$ from the compressing apparatus 20.

The low energy image signal $S_L$ and the high energy image signal $S_H$ are obtained by reading out radiation images of an object 4 from a first stimulable phosphor sheet 1A and a second stimulable phosphor sheet 1B, on which the radiation images of the object 4 have been formed with radiation having different energy distributions. The radiation images of the object 4 have been recorded on the first stimulable phosphor sheet 1A and the second stimulable phosphor sheet 1B with the one-shot energy subtraction processing technique. Specifically, radiation R is produced by a radiation source 3 and irradiated to the object 4. The radiation R, which carries the image information of the object 4, is irradiated to the first stimulable phosphor sheet 1A and the second stimulable phosphor sheet 1B, which are superposed one upon the other with an energy separating filter 2 intervening therebetween. In this manner, a radiation image (i.e., a low energy image) is formed with the radiation R, which contains a comparatively large quantity of low energy components, on the first stimulable phosphor sheet 1A, which is close to the object 4. Also, a radiation image (i.e., a high energy image) is formed with the radiation R, which has passed through the first stimulable phosphor sheet 1A, which has then passed through the energy separating filter 2 for filtering out the low energy components of the radiation R, and which contains a comparatively large quantity of high energy components, on the second stimulable phosphor sheet 1B, which is remote from the object 4. More specifically, low energy image information of the object 4 is stored on the first stimulable phosphor sheet 1A. Also, high energy image information of the object 4 is stored on the second stimulable phosphor sheet 1B.

The first stimulable phosphor sheet 1A and the second stimulable phosphor sheet 1B, on which the low energy image and the high energy image of the object 4 have respectively been stored, are set one after the other in a read-out apparatus (not shown). The low energy image of the object 4 is read out from the first stimulable phosphor sheet 1A, and the low energy image signal $S_L$ is thereby obtained. Also, the high energy image of the object 4 is read out from the second stimulable phosphor sheet 1B, and the high energy image signal $S_H$ is thereby obtained.

The energy subtraction image forming apparatus 10 receives the low energy image signal $S_L$ and the high energy image signal $S_H$ from the read-out apparatus. When necessary, the energy subtraction image forming apparatus 10 performs image position matching processing, or the like, on the low energy image signal $S_L$ and the high energy image signal $S_H$. Thereafter, the energy subtraction image forming apparatus 10 performs a subtraction process on the low energy image signal $S_L$ and the high energy image signal $S_H$. By way of example, the subtraction process may be performed in accordance with the formula shown below.

$$Sp = Ka \cdot S_L + Kb \cdot S_H + Kc$$

In the formula shown above, Ka represents the parameter, which defines the weighting of the low energy image signal $S_L$, Kb represents the parameter, which defines the weighting of the high energy image signal $S_H$, and kc represents the parameter, which defines the bias component. Ka, Kb, and Kc are fixed numbers.

The first image represented by the low energy image signal $S_L$ (i.e., the low energy image having been recorded on the first stimulable phosphor sheet 1A) is the image having been formed with the radiation R having the comparatively low energy level. Also, the second image represented by the high energy image signal $S_H$ (i.e., the high energy image having been recorded on the second stimulable phosphor sheet 1B) is the image having been formed with the radiation R having the comparatively high energy level. In cases where the object 4 is a human body, the first image and the second image have different image densities and contain the image information of a bone and a soft tissue of the human body. In cases where the subtraction process represented by the formula shown above is performed on the first image and the second image, and the energy subtraction image signal Sp is obtained from the subtraction process, the energy subtraction image represented by the energy subtraction image signal Sp is capable of being formed. Specifically, by appropriate setting of the parameters described above, the bone image signal $S_B$ representing a bone image, in which the pattern of the soft tissue has been erased and only the pattern of the bone is illustrated, is capable of being formed. Also, by appropriate setting of the parameters described above, the soft tissue image signal $S_S$ representing a soft tissue image, in which the pattern of the bone has been erased and only the pattern of the soft tissue is illustrated, is capable of being formed.

The compressing apparatus 20 receives the low energy image signal $S_L$ and the high energy image signal $S_H$, which have been obtained from the read-out apparatus. The compressing apparatus 20 also receives the bone image signal $S_B$ and the soft tissue image signal $S_S$, which have been obtained from the energy subtraction image forming apparatus 10. The compressing apparatus 20 is provided with the compression means A and the compression means B, which are capable of performing the compression processing with the different compressing processes. Each of the compression means A and the compression means B performs the compression processing with the predetermined compressing process on each of the received image signals. Specifically, of the two compression means, the compression means A receives the radiation image signals $S_L$ and $S_H$ and performs the compression processing with a reversible compressing process utilizing a low compressibility on each of the radiation image signals $S_L$ and $S_H$. The compression means B receives the energy subtraction image signals $S_B$ and $S_S$ and performs the compression processing with an irreversible compressing process utilizing a high compressibility on each of the energy subtraction image signals $S_B$ and $S_S$.

With the compression processing, the image signals are transformed into the compressed image signals $S_L'$, $S_H'$, $S_B'$, and $S_S'$. The compressed image signals $S_B'$ and $S_S'$ of the energy subtraction image signals are formed as the image signals having a size smaller than the sizes of the compressed image signals $S_L'$ and $S_H'$ of the radiation image signals. Also, the compressed image signals $S_L'$ and $S_H'$ of the radiation image signals are the image signals having been obtained from the reversible compressing process utilizing the low compressibility. Therefore, each of the compressed image signals $S_L'$ and $S_H'$ of the radiation image signals has the characteristics such that the image quality of the image represented by a decompressed image signal, which is obtained from decompression processing performed on the compressed image signal, is capable of being kept good.

Each of compressed image signals $S_L'$, $S_H'$, $S_B'$, and $S_S'$ is transferred in the compressed state from the compressing apparatus 20 into the external device 30. The external device 30 may be a display device, such as a cathode ray tube (CRT) display device, a printing device, such as a laser printer, or a storage device utilizing a hard disk, a magneto-optic disk, or the like. In cases where each of the compressed image signals $S_L'$, $S_H'$, $S_B'$, and $S_S'$ is transferred into the output device, such as the display device or the printing device, the decompression processing is performed on the compressed image signal by the output device at the transfer destination, and the decompressed image signal obtained from the decompression processing is utilized for outputting a visible image. In cases where each of the compressed image signals $S_L'$, $S_H'$, $S_B'$, and $S_S'$ is transferred into the storage device, the compressed image signal is stored in the compressed state in the storage device. When necessary, the compressed image signal having been stored is subjected to the decompression processing, and the decompressed image signal obtained from the decompression processing is utilized for certain purposes.

The radiation image signals $S_L$ and $S_H$, which are fed into the compression means A, need not necessarily be the image signals equivalent to the radiation image signals $S_L$ and $S_H$, which are fed into the energy subtraction image forming apparatus 10. The radiation image signals $S_L$ and $S_H$, which are fed into the compression means A, may be image signals having been transformed with various kinds of processing before being fed into the compressing apparatus 20.

The compressing processes in the compression means A and the compression means B need not necessarily be set such that the reversible compressing process is employed in the compression means A, and such that the irreversible compressing process is employed in the compression means B. It is sufficient for the compressing processes in the compression means A and the compression means B to be set such that the compression means B employs a compressing process utilizing a compressibility higher than the compressibility utilized in the compressing process employed in the compression means A.

In the embodiment described above, the apparatus for compressing image signals in accordance with the present invention is employed in the radiation image recording and reproducing system for performing the one-shot energy subtraction processing technique. However, the method and apparatus for compressing image signals in accordance with the present invention are not limited to the embodiment described above. The method and apparatus for compressing image signals in accordance with the present invention are applicable to various systems, in which the energy subtraction image signals and the radiation image signals to be subjected to the energy subtraction processing are transferred or stored.

What is claimed is:

1. A method of compressing image signals, comprising the steps of:
    i) obtaining a plurality of radiation image signals respectively representing a plurality of radiation images of an object, which radiation images have been formed with several kinds of radiation having different energy distributions,
    ii) obtaining an energy subtraction image signal, which has been formed from the plurality of the radiation image signals, and
    iii) performing reversible compression processing on the plurality of the radiation image signals and irreversible compression processing on the energy subtraction signal,
    wherein the energy subtraction image signal is compressed with a compressibility higher than the compressibility with respect to each of the radiation image signals.

2. An apparatus for compressing image signals wherein:
    a plurality of radiation image signals respectively representing a plurality of radiation images of an object, which radiation images have been formed with several kinds of radiation having different energy distributions, are obtained, an energy subtraction image signal, which has been formed from the plurality of the radiation image signals, is obtained, and compression processing is performed on the plurality of the radiation image signals and the energy subtraction image signal are compressed, the apparatus comprising;

a) radiation image signal compressing means for performing compression processing on each of the radiation image signals with a reversible first compressing process, and b) energy subtraction image signal compressing means for performing compression processing on the energy subtraction image signal with a an irreversible second compressing process, a compressibility in the second compressing process being higher than the compressibility in the first compressing process.

3. An apparatus as defined in claim 2 wherein the compressibility in the first compressing process is set at 1.

4. An apparatus as defined in claim 2, wherein the first compressing process is an irreversible compressing process utilizing a compressibility lower than that used in the second compressing process, and wherein the second compressing process is an irreversible compressing process.

5. The method according to claim 1, wherein the compression processing corresponding to the energy subtraction image signal is represented by 1/n, where n is an integer greater than or equal to 10.

6. The method according to claim 1, wherein the compression processing corresponding to the plurality of radiation images is represented by 1/m, where m is an integer less than or equal to 10.

7. The method according to claim 6, wherein the compression processing corresponding to the plurality of radiation images is an irreversible compressing process.

8. The method according to claim 1, wherein the compression processing corresponding to the plurality of radiation images is an irreversible compressing process utilizing a compressibility lower than that used in the compression processing corresponding to the energy subtraction signal.

9. The method according to claim 1, wherein the compression processing corresponding to the plurality of radiation images is an irreversible compression process, and wherein the compression processing corresponding to the energy subtraction image signal is an irreversible compressing process.

10. The method according to claim 1, wherein the compression processing corresponding to the plurality of radiation images is a reversible compression process, and wherein the compression processing corresponding to the energy subtraction image signal is a reversible compressing process.

11. An apparatus as defined in claim 2, wherein the first compressing process utilizes a compressibility lower than that used in the second compressing process.

* * * * *